United States Patent
Thangavelu et al.

(10) Patent No.: US 9,191,201 B1
(45) Date of Patent: Nov. 17, 2015

(54) OPTIMIZING SECURE COMMUNICATIONS

(71) Applicant: Riverbed Technology, Inc., San Francisco, CA (US)

(72) Inventors: Kumar V. Thangavelu, Sunnyvale, CA (US); Puneet Mehra, Alameda, CA (US); Aditya Jayaraman, San Francisco, CA (US); Tim Z. W. Chen, San Francisco, CA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 340 days.

(21) Appl. No.: 13/918,329

(22) Filed: Jun. 14, 2013

(51) Int. Cl.
*H04L 29/06* (2006.01)
*H04L 9/08* (2006.01)

(52) U.S. Cl.
CPC .................................... *H04L 9/0822* (2013.01)

(58) Field of Classification Search
USPC ........................................................ 713/155
See application file for complete search history.

(56) References Cited

U.S. PATENT DOCUMENTS

| | | | |
|---|---|---|---|
| 2008/0021834 A1* | 1/2008 | Holla et al. | 705/51 |
| 2012/0204032 A1* | 8/2012 | Wilkins et al. | 713/170 |
| 2013/0254529 A1* | 9/2013 | Fu et al. | 713/150 |

* cited by examiner

*Primary Examiner* — Tu Nguyen

(74) *Attorney, Agent, or Firm* — Park, Vaughan, Fleming & Dowler LLP; Laxman Sahasrabuddhe

(57) ABSTRACT

Systems and techniques are described for optimizing secure communications. A client can use an authentication protocol, e.g., Kerberos, to authenticate with the server. Specifically, the client can obtain a service ticket from a ticket granting server, and then use the service ticket to authenticate with the server. The server can respond by providing an encrypted session key. The session key can then be used by the client and server to securely communicate with each other. A wide area network (WAN) optimization device described in this disclosure is capable of obtaining the session key without decrypting the service ticket. Specifically, the WAN optimization device can use information other than the service ticket to obtain the session key.

20 Claims, 7 Drawing Sheets

OPTIMIZING SECURE COMMUNICATIONS

BACKGROUND

1. Technical Field

This disclosure relates to computer networking. More specifically, this disclosure relates to methods and apparatuses for optimizing secure communications.

2. Related Art

Enterprise networks can include one or more wide-area networks (WANs) that interconnect offices that can be distributed over a large geographical area. Improving performance of the enterprise network is important because it improves productivity, which in turn increases profitability of the organization.

Some enterprise networks use WAN optimization devices to improve network performance. WAN optimization devices optimize network traffic to improve WAN performance in reading and/or writing data over a network. Some WAN optimization devices monitor users' network traffic to attempt to predict data likely to be requested by users. This predicted data is prefetched over the WAN and cached by the WAN optimization devices at the users' respective network locations, so that this data can be quickly accessed by users if requested. WAN optimization devices also typically compress data (e.g., by performing de-duplication) to improve WAN performance. The WAN optimization devices' prefetching, caching, and compression helps mask the bandwidth and latency limitations of WANs from users.

WAN optimization devices may operate singly or in pairs at each side of a WAN connection to optimize network traffic. WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers.

Techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. In this disclosure, the term "WAN optimization device" is used to refer to such devices and applications and "WAN optimization" is used to refer to such techniques.

Optimizing secure communications is especially challenging because secure communications typically use encryption and/or authentication, which usually impedes operations such as prefetching, caching, and compression that are performed by WAN optimization devices.

SUMMARY

Some embodiments described herein provide systems and techniques for optimizing secure communications. In some embodiments, a client can be in a local domain controller's domain, and a server can be in a remote domain controller's domain. In some embodiments, a trust relationship (one-way or bidirectional) can exist between the local domain controller and the remote domain controller. Specifically, in some cloud-computing scenarios, a one-way trust may exist such that the local domain controller is the trusted domain controller, and the remote domain controller is the trusting domain controller. In some embodiments, all communications between the client and the server pass through a WAN optimization device.

In some embodiments described herein, the client can use an authentication protocol, e.g., Kerberos, to authenticate with the server. Specifically, the client can obtain a service ticket from a ticket granting server (in some embodiments, the remote domain controller can be the ticket granting server), and then use the service ticket to authenticate with the server. Once authenticated, the client and server can communicate with each other. Specifically, the server and client can exchange a session key, e.g., the server can provide an encrypted session key to the client, and the session key can then be used by the client and server to securely communicate with each other.

In some embodiments described herein, the WAN optimization device is capable of obtaining the session key without decrypting the service ticket. Specifically, in some embodiments described herein, the WAN optimization device is not in the remote domain controller's domain and/or the WAN optimization device does not have privileges to decrypt the service ticket. In these embodiments, the WAN optimization device uses information other than the service ticket to obtain the session key.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following embodiments: (1) only X; (2) only Y; (3) only Z; (4) X and Y; (5) X and Z; (6) Y and Z; and (7) X, Y, and Z.

According to one definition, a computer is any device that is capable of performing computations. In some embodiments, a computer can include a processing mechanism that is capable of executing instructions stored on a storage medium. Examples of computers include, but are not limited to, handheld computers, laptop computers, desktop computers, distributed computers, printers, appliances, etc.

According to one definition, a network is an interconnection of one or more devices that is capable of delivering information from one computer to another computer. Examples of networks include, but are not limited to, wireless and wired networks, local area networks (LANs), metropolitan area networks (MANs), WANs, private networks, public networks, intranets, internets, etc.

Figure 1:
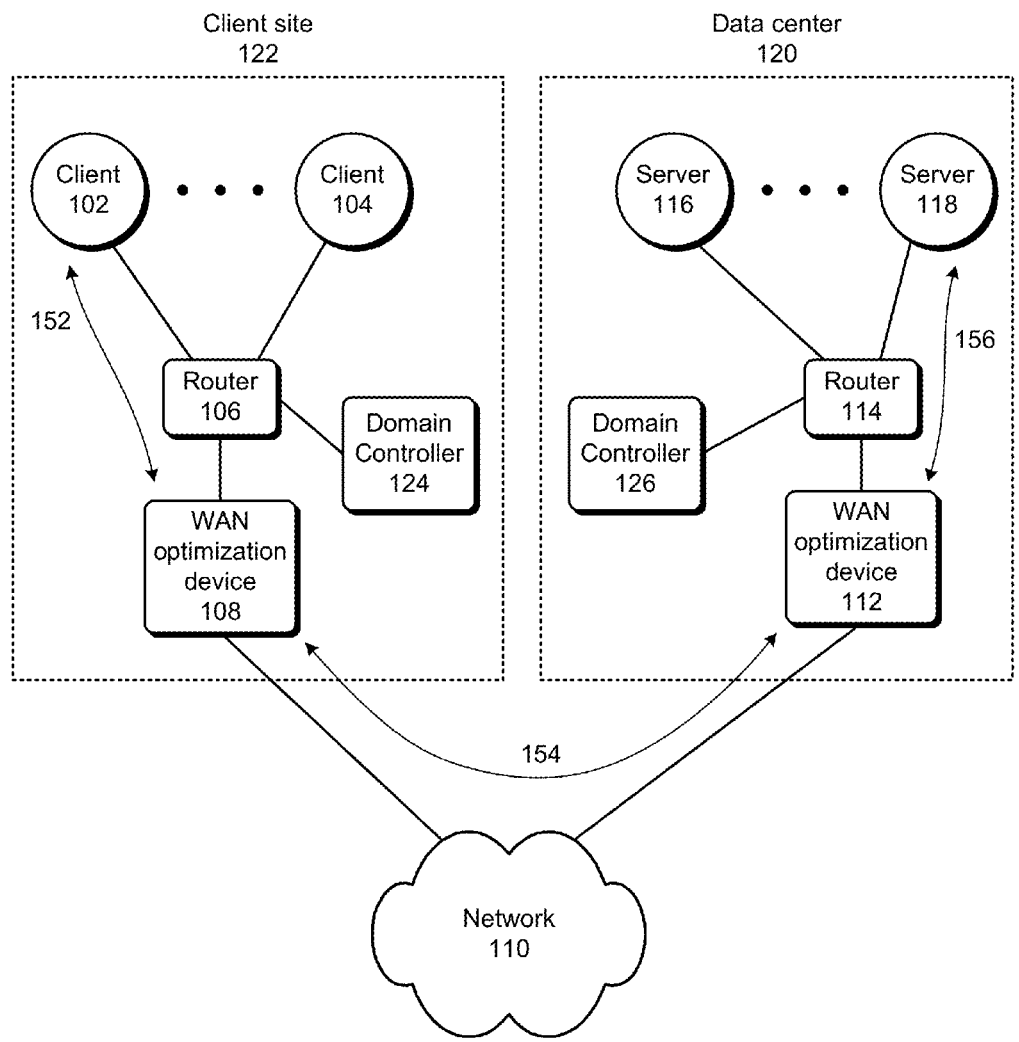
FIG. 1 illustrates an example of how a pair of WAN optimization devices can improve network performance in accordance with some embodiments described herein.

FIG. 1 illustrates an example of how a pair of WAN optimization devices can improve network performance in accordance with some embodiments described herein. Although some of the examples described in this disclosure are in the context of a WAN, the disclosed systems and techniques can generally be used to improve performance of any type of network.

Remote site 122 can be a company's headquarters or a company's regional office. Data center 120 can host servers and data storage systems for the company's enterprise network. Specifically, data center 120 can be owned and/or managed by a cloud computing service provider. Remote site 122 includes one or more clients 102-104, router 106, WAN optimization device 108, and domain controller 124. Data center 120 includes one or more servers 116-118, router 114, WAN optimization device 112, and domain controller 126. WAN optimization device 108 can communicate with WAN optimization device 112 over network 110, which can be any network, e.g., a wide area network. The number and types of devices shown in FIG. 1 are for illustration purposes only and are not intended to limit the scope of this disclosure. For example, in some embodiments, data center 120 may include one or more loan balancers that distribute network traffic between a set of network devices.

WAN optimization device 108 can establish connection 154 with WAN optimization device 112, and can use connection 154 to optimize at least some communications between clients 102-104 and servers 116-118. For example, WAN optimization devices 108 and 112 can intercept a connection between client 102 and server 116 and establish the following two connections: connection 152 between client 102 and WAN optimization device 108, and connection 156 between server 118 and WAN optimization device 112. The interception may be performed transparently, i.e., client 102 and server 118 may communicate with each other as if they had established an end-to-end connection without realizing that, in fact, the end-to-end connection was split into multiple connections by WAN optimization devices 108 and 112.

WAN optimization devices 108 and 112 can then use connections 152, 154, and 156 to optimize communications between client 102 and server 118. For example, data sent by client 102 to server 118 can be received at WAN optimization device 108. Next, WAN optimization device 108 can transform the data (e.g., by performing de-duplication) and send the transformed data to WAN optimization device 112 over connection 154. The transformation can significantly reduce the size of the data, thereby reducing the amount of bandwidth required to communicate the data over connection 154. WAN optimization device 112 can then perform an inverse transformation to recover the original data. The recovered original data can then be sent from WAN optimization device 112 to server 118. Likewise, in the return path (i.e., when server 118 sends data to client 102), data can be transformed by WAN optimization device 112 and the original data can be subsequently recovered by WAN optimization device 108.

In addition to reducing the amount of bandwidth required for communicating data over network 110, WAN optimization devices 108 and 112 can also reduce latency by, for example, performing intelligent prefetching. Specifically, WAN optimization device 108 can intelligently prefetch data from server 118 and provide the data to client 102 when WAN optimization device 108 intercepts a request for the data from client 102 to server 118. Performing intelligent prefetching can significantly reduce latency because the round trip time from client 102 to WAN optimization device 108 can be significantly smaller than the round trip time from client 102 to server 118.

It can be challenging to optimize secure network traffic, e.g., the network traffic between client 102 and server 118 when the client 102 and server 118 use a secure communication protocol to communicate with each other. Specifically, to optimize the network traffic, WAN optimization devices 108 and 112 may need to obtain the encryption key (e.g., the session key) that client 102 and server 118 are using to encrypt/decrypt the network traffic and/or to generate checksums. Some examples of how WAN optimization devices can optimize secure network traffic are now described.

According to one definition, a domain is a collection of users, groups, computing resources (e.g., computers, printers, etc.), and/or services (e.g., email, internet access, etc.). According to one definition, a domain controller is a server (e.g., a piece of executable code that is executing on a computer) that, inter alia, manages access to resources in the domain, e.g., by authenticating users and granting access to one or more computing resources and/or services in the domain. Specifically, a domain controller can maintain a database that specifies which user and/or group of users is allowed to access which computing resource and/or service. To use a computing resource and/or service in the domain, a user has to first authenticate with the domain controller. If a user successfully authenticates, the domain controller can then allow the user to access the resources that the user is authorized to access (e.g., according to the database that specifies which user is allowed to access which computing resource).

For example, an authentication protocol such as Kerberos can be used for authenticating users and for securely granting access to resources and/or services in the domain. Although some of the examples in this disclosure are described in the context of Kerberos, it will be apparent to a person having ordinary skill in the art that the techniques and systems described in this disclosure can also be applied to other secure communication protocols.

Figure 2:
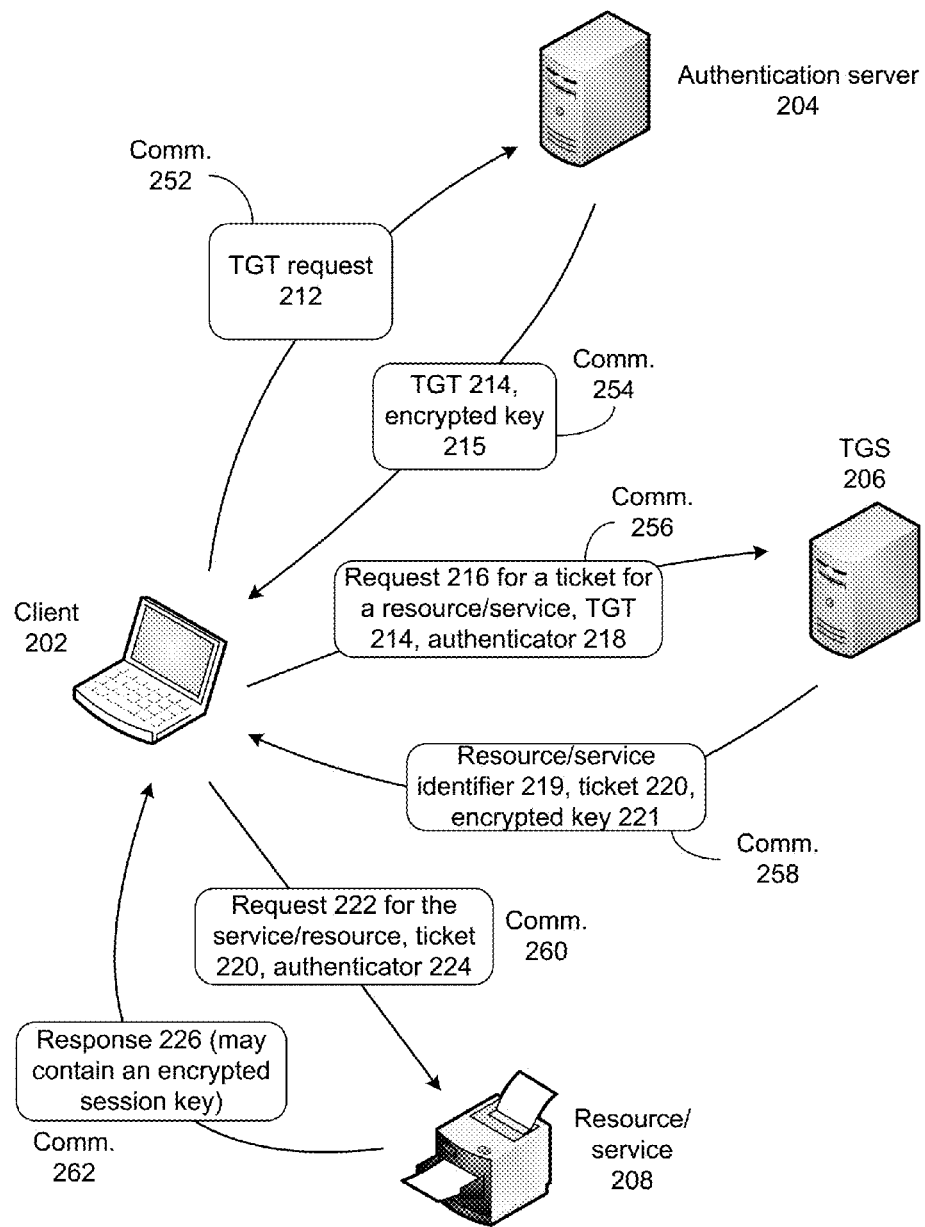
FIG. 2 illustrates an example of an authentication protocol in accordance with some embodiments described herein.

FIG. 2 illustrates an example of an authentication protocol in accordance with some embodiments described herein. Although the following discussion uses a Kerberos example to describe the communication protocol illustrated in FIG. 2, many variations and modifications to the protocol illustrated in FIG. 2 will be apparent to a person having ordinary skill in the art.

Let us assume that client 202 wants to access resource/service 208 over a communication network. First, client 202 sends a ticket granting ticket (TGT) request 212 to authentication server 204 (communication 252). Authentication server 204 returns a ticket granting ticket (TGT) 214 and an encrypted key 215 to client 202 (communication 254). Encrypted key 215 is obtained by encrypting a key that is within TGT 214 with a key associated with the client (e.g., a key that is derived from the client's password), thereby enabling the client to decrypt encrypted key 215 and obtain the key that is in TGT 214. TGT 214 enables client 202 to request a ticket for a particular resource or service from ticket granting server (TGS) 206.

In Kerberos, a TGT can be represented as "[client identifier, client address, validity period, Key(client, TGS)]Key (TGS)." The notation "[x]y" refers to the result of encrypting data "x" with key "y." The notation "Key(u)" refers to a key that is associated with entity "u." The notation "Key(u, v)" refers to a key that is associated with the tuple of entities "(u, v)." For example, if a key is shared between entities "u" and "v," then the notation "Key(u, v)" can be used to refer to the shared key. With this notation in mind, the above-described Kerberos TGT can be obtained by encrypting the data "client identifier, the client address, the validity period, Key(client, TGS)" with the key "Key(TGS)" which is the TGS's key. Note that the key "Key(client, TGS)" can be a key that is shared between the client and the TGS. The encrypted key in Kerberos can be represented as "[Key(client, TGS)]Key(client)."

Client 202 can then provide the following information in communication 256 to TGS 206: a request 216 for a ticket for a resource/service, TGT 214, and authenticator 218. Request 216 identifies the resource/service for which a ticket is being requested, and TGT 214 together with authenticator 218 authenticates client 202 to TGS 206. In Kerberos, authenticator 218 can be represented as "[client, timestamp]Key(client, TGS)."

Once TGS 206 authenticates client 202 based on TGT 214 and authenticator 218, TGS 206 responds to request 216 by providing resource/service identifier 219, ticket 220, and encrypted key 221 (communication 258). Resource/service identifier 219 identifies the resource/service corresponding to ticket 220 (resource/service identifier 219 can be the same as the one that was provided in request 216), and ticket 220 enables client 202 to securely access the resource/service corresponding to ticket 220. Encrypted key 221 is obtained by encrypting a key that is within ticket 220 with a key that is associated with the client, thereby enabling the client to decrypt encrypted key 221 and obtain the key that is in ticket 220.

In Kerberos, ticket 220 can be represented as "[client identifier, client address, validity period, Key(client, service)]Key(service)," and encrypted key 221 can be represented as "[Key(client, service)]Key(client, TGS)."

After receiving the response from TGS 206, client 202 can then provide the following information in communication 260 to resource/service 208: a request for the resource/service 222, ticket 220, and authenticator 224. Request 222 identifies the resource/service that is being requested, and TGT 220 together with authenticator 224 authenticates client 202 to resource/service 208. In Kerberos, authenticator 224 can be represented as "[client, timestamp]Key(client, service)."

Once resource/service 208 authenticates client 202 based on ticket 220 and authenticator 224, resource/service 208 can provide response 226 (communication 262). Response 226 may provide access to the resource or provide the service that was requested. In some embodiments, response 226 can include a session key that is then used for subsequent communications between client 202 and resource/service 208. In some embodiments, the client may provide the session key in authenticator 224. Specifically, response 226 can include an encrypted version of the session key (e.g., a randomly generated key), wherein the session key is encrypted using a key, e.g., Key(client, service), that is shared between client 202 and resource/service 208. For example, the encrypted session key can be represented as "[Key(session)]Key(client, service)."

In some networks, the session key that is shared between client 202 and resource/service 208 is required for optimizing network traffic between these two entities. For example, in Common Internet File System (CIFS), each packet has a checksum that is generated using a key (e.g., the session key) that is derived from authentication. If this key is not known to a WAN optimization device, the WAN optimization device may be unable to prefetch data and/or perform de-duplication.

If a network includes a domain controller and if the WAN optimization device has the appropriate privileges, then the WAN optimization device may be able to obtain the requisite key(s) from the domain controller for optimizing network traffic. For example, a WAN optimization device can intercept ticket 220 when client 202 sends ticket 220 to resource/service 208. Next, the WAN optimization device can obtain the key that TGS 206 used for generating ticket 220, and use the key to decrypt ticket 220. The decrypted ticket 220 can then enable the WAN optimization device to decrypt the encrypted session key that is provided by the resource/service 208 to client 202. Once the WAN optimization device obtains the session key, the WAN optimization device can optimize network traffic between client 202 and resource/service 208.

For example, in the above-described Kerberos embodiment, the WAN optimization device can obtain the key "Key(service)" from the ticket granting server (because the WAN optimization device has special privileges), and then use the key "Key(service)" to decrypt the service ticket to obtain the key "Key(client, service)." Next, the WAN optimization device can intercept the response from the resource/server and decrypt the encrypted session key using the key "Key(client, service)."

Figure 3A:
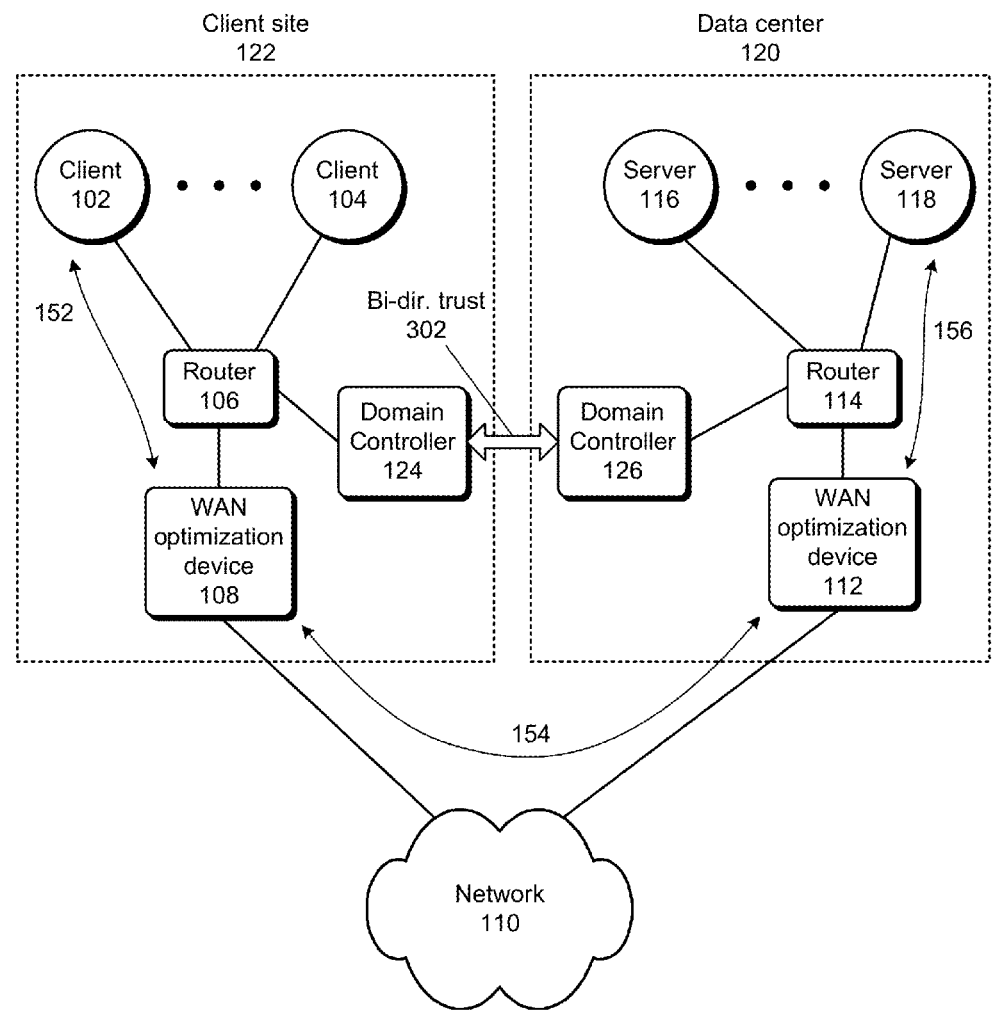
FIG. 3A illustrates a network that has two domain controllers that have a bi-directional trust between them in accordance with some embodiments described herein.

Some networks have multiple domain controllers, and each pair of domain controllers may have a trust relationship between them. FIG. 3A illustrates a network that has two domain controllers that have a bi-directional trust between them in accordance with some embodiments described herein. Specifically, domain controllers 124 and 126 have bi-directional trust 302 between them.

Consider the scenario where there are multiple domain controllers that have a bi-directional trust relationship between them. Without loss of generality, let us assume that client 102 wants to request a service from server 116, and that a domain controller also acts as the authentication server and the ticket granting server. First, client 102 can obtain a ticket granting ticket from the local domain controller, i.e., domain controller 124 (e.g., by using communications similar to communications 252 and 254 shown in FIG. 2). Next, client 102 can use the ticket granting ticket to obtain a cross-domain ticket granting ticket from domain controller 124. The cross-domain ticket granting ticket enables client 102 to authenticate itself to the remote domain controller, i.e., domain controller 126. Client 102 can then use the cross-domain ticket granting ticket to obtain a service ticket from domain controller 126 (e.g., by using communications similar to communications 256 and 258 shown in FIG. 2). Next, client 102 can use the service ticket to request the desired service from server 116 (e.g., by using communications similar to communications 260 and 262 shown in FIG. 2).

In such a scenario, WAN optimization device(s) can optimize network traffic as follows. WAN optimization devices 108 and/or 112 can intercept the service ticket when client 102 sends the service ticket to server 116. In this scenario, we assume without loss of generality that WAN optimization device 108 and/or 112 can obtain the key that domain controller 126 used for generating the service ticket, and use this key to decrypt the service ticket. For example, domain controller 126 may be configured to give WAN optimization device 108 and/or 112 special privileges that enable WAN optimization device 108 and/or 112 to request keys from the domain controller 126. The decrypted service ticket can then enable WAN optimization devices 108 and/or 112 to decrypt the encrypted session key that is provided by server 116 to client 102. Once WAN optimization devices 108 and/or 112 obtain the session key, they can optimize network traffic between client 102 and server 116.

If none of the WAN optimization devices have been given special privileges (e.g., privileges to request keys) by the remote domain controller, then the WAN optimization devices may not be able to decrypt the service ticket. Therefore, the above-described approach for optimizing network traffic would not work in such situations. In some situations, a one-way trust exists between the local and the remote domain controller. Some embodiments described herein can use this one-way trust to obtain the keys that are required for optimizing network traffic. Some of these embodiments are now described.

Figure 3B:
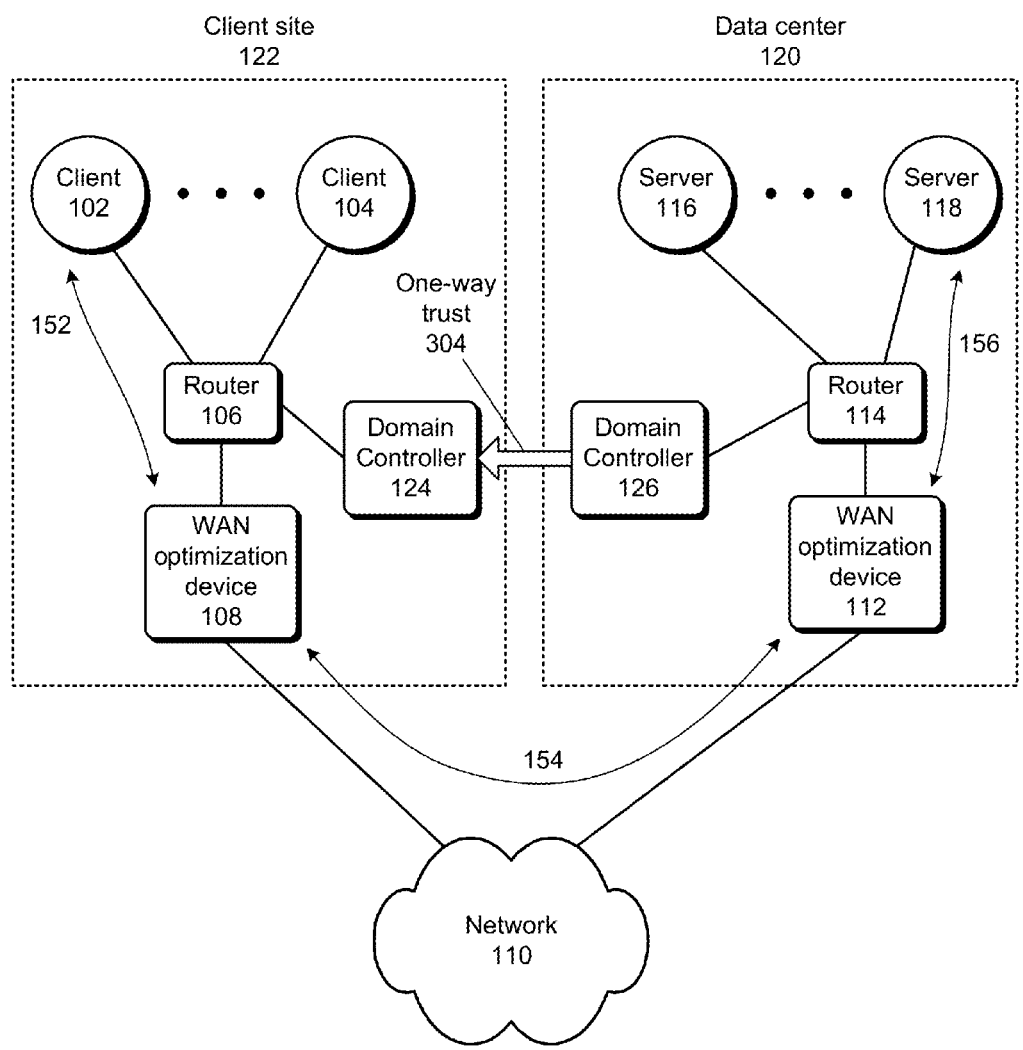
FIG. 3B illustrates a network that has two domain controllers that have a one-way trust between them in accordance with some embodiments described herein.

FIG. 3B illustrates a network that has two domain controllers that have a one-way trust between them in accordance with some embodiments described herein. In FIG. 3B, although WAN optimization device 112 is located in data center 120, WAN optimization device 112 is not in the domain of domain controller 126. WAN optimization devices 108 and 112 can obtain keys from domain controller 124. Furthermore, domain controllers 124 and 126 have a one-way trust 304 between them. The arrow from domain controller 126 to 124 indicates that domain controller 126 is the trusting domain controller and domain controller 124 is the trusted domain controller. Computers and/or users that are in the domain of domain controller 124 can authenticate themselves with computers that are in the domain of domain controller 126. However, the opposite is not true, i.e., computers that are in the domain of domain controller 126 cannot authenticate themselves with computers that are in the domain of domain controller 124.

The network optimization approach that was described with reference to FIG. 3A would not work in the situation illustrated in FIG. 3B because WAN optimization devices 108 and 112 have not been given special privileges by domain controller 126, and therefore cannot obtain the key (e.g., "Key(service)" in the example shown in FIG. 3A) from domain controller 126 to decrypt the service ticket. However, as described in reference to FIG. 3C below, some embodiments described herein can obtain the session key without decrypting the service ticket.

Figure 3C:
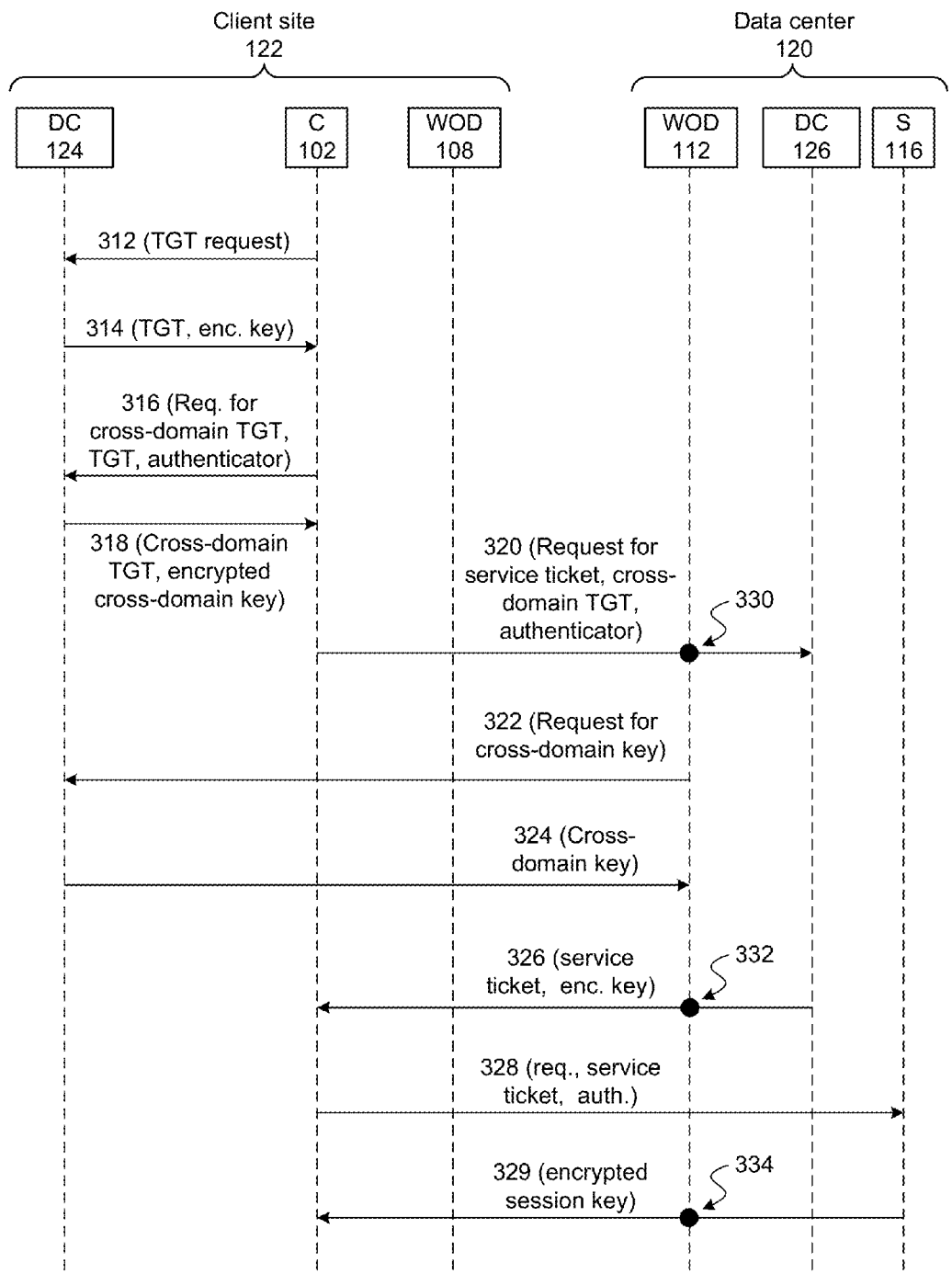
FIG. 3C illustrates how network traffic in FIG. 3B can be optimized in accordance with some embodiments described herein.

FIG. 3C illustrates how network traffic in FIG. 3B can be optimized in accordance with some embodiments described herein. Although the following discussion uses Kerberos to illustrate how network traffic can be optimized, many variations and modifications to the protocol illustrated in FIG. 3C will be apparent to a person having ordinary skill in the art. FIG. 3C illustrates the communication between entities shown in FIG. 3B. The labels "DC 124," "C 102," "WOD 108," "WOD 112," "DC 126," and "S 116," in FIG. 3C refer to the domain controller 124, client 102, WAN optimization device 108, WAN optimization device 112, domain controller 126, and server 116, respectively, in FIG. 3B. Note that all network traffic between client site 122 and data center 120 passes through WAN optimization device 112.

Client 102 can send a TGT request to domain controller 124 (communication 312). Domain controller 124 can then provide a TGT and an encrypted key to client 102 (communication 314). In Kerberos, the TGT can be represented as "[client identifier, the client address, the validity period, Key (client, TGS)]Key(TGS)," where "Key(TGS)" is domain controller 124's key. The encrypted key can be represented as "[Key(client, TGS)]Key(client)," where Key(client) is client 102's key (which is also known to domain controller 124).

Next, client 102 can decrypt the encrypted key to obtain "Key(client, TGS)," and request a cross-domain TGT from domain controller 124 (communication 316). Communication 316 also includes the TGT that the client received from the domain controller and an authenticator. In Kerberos, the authenticator can be represented as "[client, timestamp]Key (client, TGS)."

In response to communication 316, domain controller 124 can provide the cross-domain TGT and an encrypted cross-domain key to client 102 (communication 318). In Kerberos, the cross-domain TGT can be represented as "[client identifier, the client address, the validity period, Key(client, remote-TGS)]Key(remote-TGS)," where "Key(remote-TGS)" is domain controller 126's key. The encrypted key can be represented as "[Key(client, remote-TGS)]Key(client)," where Key(client) is client 102's key (which is also known to domain controller 124).

Client 102 can then provide a request for a service ticket, the cross-domain TGT, and an authenticator to domain controller 126 (communication 320). In Kerberos, the authenticator can be represented as "[client, timestamp]Key(client, remote-TGS)." Note that the cross-domain TGT passes through WAN optimization device 112. WAN optimization device 112 can intercept communication 320. Specifically, WAN optimization device 112 can store a copy of the cross-domain TGT and/or the authenticator, and then forward the contents of communication 320 to its destination, namely, domain controller 126. Interceptions 330, 332, and 334 of communications are shown using a shaded circle in FIG. 3C. Interceptions 330, 332, and 334 can be performed transparently, i.e., without any knowledge of the interceptions, thereby enabling the end nodes (e.g., client 102 and server 116) to continue to operate as if the communications were not being intercepted.

The cross-domain TGT is encrypted using a cross-domain key that is shared between domain controllers 124 and 126. In some embodiments described herein, WAN optimization device 112 can obtain the cross-domain key (which can be represented as "Key(remote-TGS)") from domain controller 124. Specifically, WAN optimization device 112 can securely request domain controller 124 to provide the cross-domain key (communication 322), and domain controller 124 can securely respond by providing the cross-domain key to WAN optimization device 112 (communication 324). WAN optimization device 112 can then use the cross-domain key to decrypt the cross-domain TGT and obtain the shared key between client 102 and domain controller 126. In Kerberos, WAN optimization device 112 can use "Key(remote-TGS)" to decrypt the cross-domain TGT and obtain "Key(client, remote-TGS)." In other embodiments (e.g., embodiments that use an authentication protocol other than Kerberos), WAN optimization device 112 can securely request domain controller 124 to directly provide the shared key between client 102 and domain controller 126. In any case, once WAN optimization device 112 obtains the shared key between client 102 and domain controller 126, WAN optimization device 112 can act on behalf of client 102.

In response to communication 320, domain controller 126 can provide a service ticket and an encrypted key to client 102 (communication 326). In Kerberos, the service ticket can be represented as "[client identifier, client address, validity period, Key(client, service)]Key(service)," where "Key(service)" is server 116's key. The encrypted key can be represented as "[Key(client, service)]Key(client, remote-TGS)."

Communication 326 can be intercepted by WAN optimization device 112. Note that, in the example shown in FIG. 3C, WAN optimization device 112 cannot obtain server 116's key (e.g., "Key(service)") because WAN optimization device 112 is not in the domain of domain controller 126 and/or does not have the requisite privileges to obtain the key. Therefore, in the example shown in FIG. 3C, WAN optimization device 112 cannot decrypt the service ticket. However, WAN optimization device 112 has the shared key between client 102 and domain controller 126 (e.g., Key(client, remote-TGS)]"), and WAN optimization device 112 can use this shared key to decrypt the encrypted key (e.g., "[Key(client, service)]Key (client, remote-TGS)]"). Once WAN optimization device 112 obtains the shared key (e.g., "[Key(client, service)]") between client 102 and server 116, WAN optimization device can request services on behalf of client 102 and/or obtain the session key as explained below.

Client 102 can send a service request, the service ticket, and an authenticator to server 116 (communication 328). In Kerberos, the authenticator can be represented as "[client, timestamp]Key(client, service)." In response to communication 328, server 116 can provide an encrypted session key to client 102 (communication 329). The encrypted session key can be represented as "[Key(session)]Key(client, service)]." Communication 329 can be intercepted by WAN optimization device 112. Since WAN optimization device 112 already knows the shared key (e.g., "Key(client, service)") between client 102 and server 116, WAN optimization device 112 can decrypt the encrypted session key in communication 329, and use the session key (e.g., "Key(session)") to optimize network traffic between client 102 and server 116.

In some embodiments, client 102 may not require server 116 to authenticate. In such embodiments, communication 329 may not be sent from server 116 to client 102, and the session key "Key(session)" can be included in a communication that is sent from client 102 to server 116, e.g., in the authenticator in communication 328. In these embodiments, WAN optimization device 112 can intercept communication 328 and decrypt the encrypted session key.

The example shown in FIG. 3C is for illustration purposes only and is not intended to limit the scope of this disclosure. Many modifications and variations will be apparent to practitioners skilled in the art. For example, in some embodiments, client 102 and server 116 may decide to use the shared key (e.g., "Key(client, service)") to encrypt communications instead of using a session key (e.g., "Key(session)). In such embodiments, WAN optimization device 112 can use the shared key instead of the session key to optimize network traffic between client 102 and server 116. In some embodiments, domain controller 124 may have a replica that is located in data center 120 (the replica can periodically communicate with domain controller 124 to ensure that the state of the replica and the state of the domain controller 124 are synchronized). Therefore, in such embodiments, communications 322 and 324 may occur within data center 120 and may not traverse the WAN.

Figure 4:
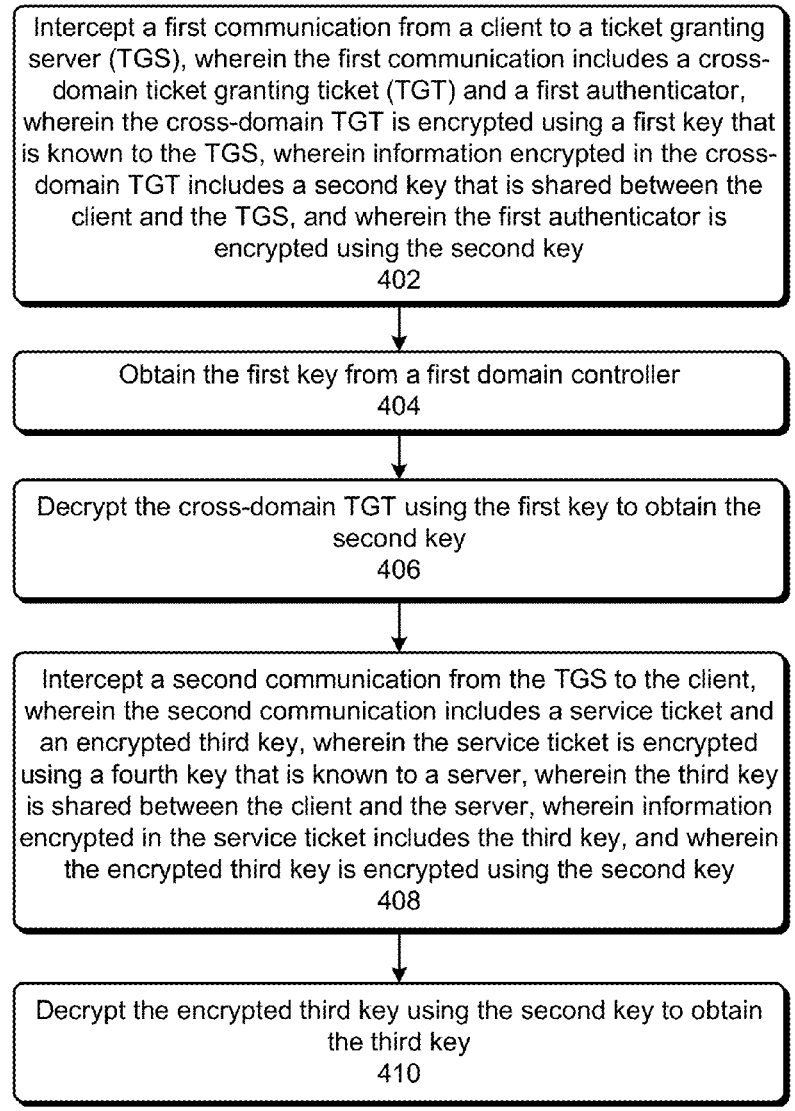
FIG. 4 presents a flowchart that illustrates a process for optimizing secure communications in accordance with some embodiments described herein.

FIG. 4 presents a flowchart that illustrates a process for optimizing secure communications in accordance with some embodiments described herein. The process can begin with intercepting a first communication from a client to TGS, wherein the first communication includes a cross-domain TGT and a first authenticator, wherein the cross-domain TGT is encrypted using a first key that is known to the TGS, wherein information encrypted in the cross-domain TGT includes a second key that is shared between the client and the TGS, and wherein the first authenticator is encrypted using the second key (operation 402). The first communication can correspond to communication 320 shown in FIG. 3C. In the Kerberos example described in reference to FIG. 3C, the first key can correspond to "Key(remote TGS)" and the second key can correspond to "Key(client, remote TGS)."

Next, the first key can be obtained from a first domain controller (operation 404). Operation 404 can correspond to communications 322 and 324 shown in FIG. 3C. The cross-domain TGT can then be decrypted using the first key to obtain the second key (operation 406).

Next, a second communication from the TGS to the client can be intercepted, wherein the second communication includes a service ticket and an encrypted third key, wherein the service ticket is encrypted using a fourth key that is known to a server, wherein the third key is shared between the client and the server, wherein information encrypted in the service ticket includes the third key, and wherein the encrypted third key is encrypted using the second key (operation 408). The second communication can correspond to communication 326 shown in FIG. 3C. In the Kerberos example described in reference to FIG. 3C, the third key can correspond to "Key (client, service)" and the fourth key can correspond to "Key (service)."

The encrypted third key can then be decrypted using the second key to obtain the third key (operation 410). The third key can then be used to optimize network traffic between the client and the server. In some embodiments, a third communication between the server and the client can be intercepted, wherein the third communication includes an encrypted session key that is encrypted using the third key (this interception can correspond to interception 334 shown in FIG. 3C). In these embodiments, the encrypted session key can be decrypted using the third key to obtain the session key, and then the session key can be used to optimize network traffic between the client and the server. Specifically, in some embodiments, optimizing network traffic between the client and the server includes generating a checksum using the session key.

In some embodiments, the server is not in the first domain controller's domain. Specifically, in some embodiments, the client is in the first domain controller's domain, the server is in a second domain controller's domain, and a one-way trust exists between the first domain controller and the second domain controller, wherein the first domain controller is the trusted domain controller, and the second domain controller is the trusting domain controller. Specifically, in some embodiments, the first domain controller can belong to a customer of a cloud service provider and the second domain controller can belong to the cloud service provider that is providing cloud computing services to the customer.

In some embodiments, the client is in the first domain controller's domain, the server is in a second domain controller's domain, and a bidirectional trust exists between the first domain controller and the second domain controller.

In some embodiments, the client can be at a first network site, and the TGS and the server can be at a second network site. Specifically, the second network site can be a cloud service provider location. The first network site and the second network site may each include a WAN optimization device. the hardware device is a wide area network (WAN) optimization device, and wherein all network traffic between the first network site and the second network site passes through the hardware device.

Figure 5:
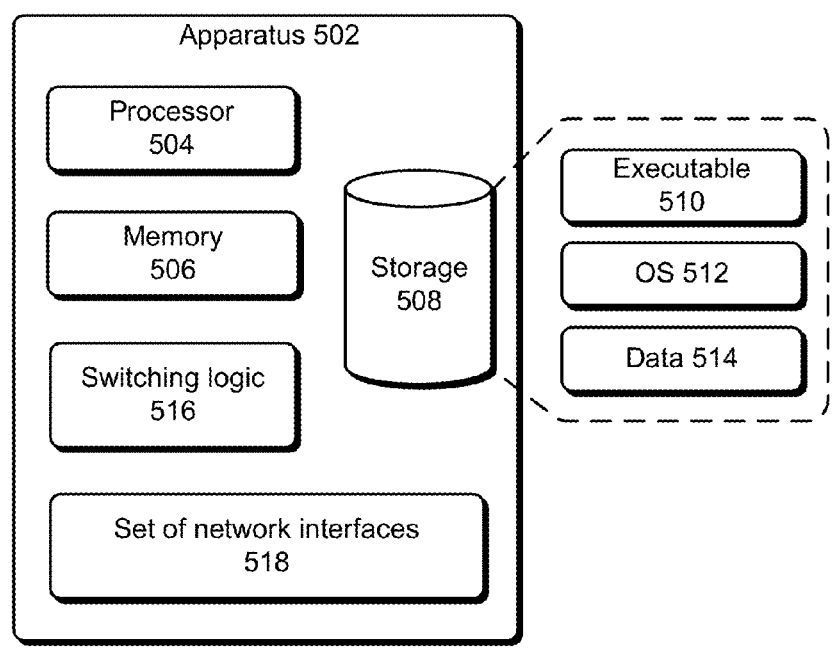
FIG. 5 illustrates an apparatus for optimizing network traffic in accordance with some embodiments described herein.

FIG. 5 illustrates an apparatus for optimizing network traffic in accordance with some embodiments described herein. Apparatus 502 comprises processor 504, memory 506 (e.g., a volatile or non-volatile random access memory), and storage 508 (e.g., a flash memory device or a disk drive). Storage 508 can store executable 510, operating system 512, and data 514. Apparatus 502 also includes switching logic 516 and set of network interfaces 518. The different components in apparatus 502 can communicate with one another using a communication mechanism, e.g., a bus, a backplane, and/or a switching fabric.

Executable 510 can include instructions that, when executed by processor 504, cause apparatus 502 to perform one or more methods that are implicitly or explicitly described in this disclosure. Specifically, in some embodiments, executable 510 can include instructions for transparently intercepting one or more communications between devices, obtaining one or more encryption keys based on the intercepted communications, and using the one or more encryption keys to optimize network traffic.

Data 514 can include any data that is inputted into or outputted by executable 510. Set of network interfaces 518 can be used to transmit data to and/or receive data from other communication devices. Switching logic 516 can forward network traffic received on one or more network interfaces in accordance with switching/routing information stored in apparatus 502.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing network traffic, the method comprising:
a hardware device intercepting a first communication from a client to a ticket granting server (TGS), wherein the first communication includes a cross-domain ticket granting ticket (TGT) and a first authenticator, wherein the cross-domain TGT is encrypted using a first key that is known to the TGS, wherein information encrypted in the cross-domain TGT includes a second key that is shared between the client and the TGS, and wherein the first authenticator is encrypted using the second key;
the hardware device obtaining the first key from a first domain controller;
the hardware device decrypting the cross-domain TGT using the first key to obtain the second key;
the hardware device intercepting a second communication from the TGS to the client, wherein the second communication includes a service ticket and an encrypted third key, wherein the service ticket is encrypted using a fourth key that is known to a server, wherein the third key is shared between the client and the server, wherein information encrypted in the service ticket includes the third key, and wherein the encrypted third key is encrypted using the second key; and
the hardware device decrypting the encrypted third key using the second key to obtain the third key.

2. The method of claim 1, further comprising:
the hardware device intercepting a third communication between the server and the client, wherein the third communication includes an encrypted session key that is encrypted using the third key; and
the hardware device decrypting the encrypted session key using the third key to obtain the session key.

3. The method of claim 2, further comprising:
the hardware device optimizing network traffic between the client and the server using the session key.

4. The method of claim 3, wherein said optimizing includes generating a checksum for a packet using the session key, encrypting the packet using the session key, or decrypting the packet using the session key.

5. The method of claim 1, wherein the server is not in the first domain controller's domain.

6. The method of claim 5, wherein the client is in the first domain controller's domain, wherein the server is in a second domain controller's domain, and wherein a one-way trust or a bidirectional trust exists between the first domain controller and the second domain controller.

7. The method of claim 1, wherein the client is at a first network site, wherein the TGS and the server are at a second network site, wherein the hardware device is a wide area network (WAN) optimization device, and wherein all network traffic between the first network site and the second network site passes through the hardware device.

8. A non-transitory computer-readable storage medium storing instructions that, when executed by a wide area network (WAN) optimization device, cause the WAN optimization device to perform a method for optimizing network traffic, the method comprising:
intercepting a first communication from a client to a ticket granting server (TGS), wherein the first communication includes a cross-domain ticket granting ticket (TGT) and a first authenticator, wherein the cross-domain TGT is encrypted using a first key that is known to the TGS, wherein information encrypted in the cross-domain TGT includes a second key that is shared between the client and the TGS, and wherein the first authenticator is encrypted using the second key;

obtaining the first key from a first domain controller;

decrypting the cross-domain TGT using the first key to obtain the second key;

intercepting a second communication from the TGS to the client, wherein the second communication includes a service ticket and an encrypted third key, wherein the service ticket is encrypted using a fourth key that is known to a server, wherein the third key is shared between the client and the server, wherein information encrypted in the service ticket includes the third key, and wherein the encrypted third key is encrypted using the second key; and decrypting the encrypted third key using the second key to obtain the third key.

9. The non-transitory computer-readable storage medium of claim 8, the method further comprising:

intercepting a third communication between the server and the client, wherein the third communication includes an encrypted session key that is encrypted using the third key; and decrypting the encrypted session key using the third key to obtain the session key.

10. The non-transitory computer-readable storage medium of claim 9, the method further comprising:

optimizing network traffic between the client and the server using the session key.

11. The non-transitory computer-readable storage medium of claim 10, wherein said optimizing includes generating a checksum for a packet using the session key, encrypting the packet using the session key, or decrypting the packet using the session key.

12. The non-transitory computer-readable storage medium of claim 8, wherein the server is not in the first domain controller's domain.

13. The non-transitory computer-readable storage medium of claim 12, wherein the client is in the first domain controller's domain, wherein the server is in a second domain controller's domain, and wherein a one-way trust or a bidirectional trust exists between the first domain controller and the second domain controller.

14. The non-transitory computer-readable storage medium of claim 8, wherein the client is at a first network site, wherein the TGS and the server are at a second network site, and wherein all network traffic between the first network site and the second network site passes through the WAN optimization device.

15. An apparatus, comprising:

a processor; and a memory storing instructions that, when executed by the processor, cause the apparatus to perform a method for optimizing network traffic, the method comprising:

intercepting a first communication from a client to a ticket granting server (TGS), wherein the first communication includes a cross-domain ticket granting ticket (TGT) and a first authenticator, wherein the cross-domain TGT is encrypted using a first key that is known to the TGS, wherein information encrypted in the cross-domain TGT includes a second key that is shared between the client and the TGS, and wherein the first authenticator is encrypted using the second key;

obtaining the first key from a first domain controller;

decrypting the cross-domain TGT using the first key to obtain the second key;

intercepting a second communication from the TGS to the client, wherein the second communication includes a service ticket and an encrypted third key, wherein the service ticket is encrypted using a fourth key that is known to a server, wherein the third key is shared between the client and the server, wherein information encrypted in the service ticket includes the third key, and wherein the encrypted third key is encrypted using the second key; and decrypting the encrypted third key using the second key to obtain the third key.

16. The apparatus of claim 15, wherein the memory further storing instructions that, when executed by the processor, cause the apparatus to perform the following operations:

intercepting a third communication between the server and the client, wherein the third communication includes an encrypted session key that is encrypted using the third key; and decrypting the encrypted session key using the third key to obtain the session key.

17. The apparatus of claim 16, wherein the memory further storing instructions that, when executed by the processor, cause the apparatus to perform the following operations:

optimizing network traffic between the client and the server using the session key.

18. The apparatus of claim 17, wherein said optimizing includes generating a checksum for a packet using the session key, encrypting the packet using the session key, or decrypting the packet using the session key.

19. The apparatus of claim 15, wherein the server is not in the first domain controller's domain.

20. The apparatus of claim 19, wherein the client is in the first domain controller's domain, wherein the server is in a second domain controller's domain, and wherein a one-way trust or a bidirectional trust exists between the first domain controller and the second domain controller.

* * * * *